United States Patent [19]

Ferguson

[11] Patent Number: 4,538,202

[45] Date of Patent: Aug. 27, 1985

[54] CURRENT TRANSFORMER SECONDARY VOLTAGE LIMITER

[75] Inventor: Donald K. Ferguson, Peterborough, Canada

[73] Assignee: Canadian General Electric Company Limited, Toronto, Canada

[21] Appl. No.: 582,812

[22] Filed: Feb. 23, 1984

[30] Foreign Application Priority Data

May 27, 1983 [CA] Canada .................................. 429079

[51] Int. Cl.$^3$ ........................ H02H 1/00; H01H 61/00

[52] U.S. Cl. ...................................... 361/124; 337/17; 337/31

[58] Field of Search .................. 361/117, 124; 337/15, 337/17, 24, 28, 30, 31, 32

[56] References Cited

U.S. PATENT DOCUMENTS 4,074,337 2/1978 Debortoli et al. .................. 361/124

FOREIGN PATENT DOCUMENTS 158414 10/1914 Canada .

887797 12/1971 Canada .

*Primary Examiner*—Harold Broome

*Attorney, Agent, or Firm*—Raymond A. Eckersley

[57] ABSTRACT

A device for protecting the secondary winding of a current transformer against destructive or dangerous overvoltages when connected across the secondary, has a transparent tubular casing with a stud support and conductive stud within one end. The stud is threadably mounted in the stud support so it can be adjusted longitudinally and it has an arcing surface on its inner end. Within the other end a support member carries a longitudinally sliding conductive plunger. The plunger is biased inwardly towards the arcing surface of the stud but it is restrained from inward movement by a fusible element which engages it and restrains it. The fusible element forms another arcing surface spaced a predetermined distance from the arcing surface on the stud. One terminal is provided on the outer end of the conductive stud and another on the outer end of the support member connected to the plunger by a flexible braid. A small overvoltage of short duration causes an arc current to flow to limit the voltage. An overvoltage of longer duration fuses the fusible element allowing the plunger to move inwardly to short the terminals and the secondary windings. If desired an auxiliary contact arrangement will indicate when the fusible element has fused and the device shorted.

13 Claims, 2 Drawing Figures

CURRENT TRANSFORMER SECONDARY VOLTAGE LIMITER

FIELD OF THE INVENTION

This invention relates to apparatus for protecting electrical equipment, and in particular it relates to protective apparatus for limiting or suppressing the voltage on the secondary winding of a current transformer.

BACKGROUND OF THE INVENTION

It is desirable to prevent transient overvoltages or longer duration overvoltages on the secondary winding of a current transformer to prevent damage to the transformer and to avoid high voltages on the apparatus to which the secondary winding is connected as such voltages could be hazardous to personnel. A transient overvoltage might result, for example, from a temporary disturbance in the power system, and an overvoltage of longer duration might result, for example, from an open circuit in the secondary winding of the current transformer due perhaps to maintenance or due to a simple mechanical break. While overvoltages should be prevented to avoid damage to the transformer or to avoid high voltages which might be hazardous to personnel, any protective apparatus connected to the transformer should not affect the accuracy of the current transformer.

It is known to use a spark gap device connected across the secondary winding of a current transformer to limit the voltage on the secondary. One advantage of this device is that the gap can be selected so that the arc is initiated only when the voltage is above the working range of voltages and consequently there is no current drawn over the working range so that the accuracy is not affected. In addition, the device is re-useable. Once the overvoltage disappears, the arc stops. On the other hand, while the spark gap devices handle transient voltages, they frequently are unable to properly limit overvoltages of longer duration resulting, for example, from an open secondary circuit. In addition, the arcing causes wear of the terminals, increases the spark gap, which proportionally increases the let-through voltage.

It is also known to connect non-linear resistors across the secondary winding of a current transformer to limit overvoltages. The non-linear resistors draw a leakage current which affects the accuracy of the transformer.

Other apparatus is available which combines spark gap devices with non-linear resistors but they all have a leakage current or are unable to handle the power involved in protecting the secondary of a current transformer.

Protective apparatus for performing related functions is also known. For example, Canadian Pat. No. 887,797 - Thoren, issued Dec. 7, 1971 describes a device for limiting surges or overvoltages in AC power networks. A spark gap device or surge diverter is connected in series with the primary windings of a current transformer between the network and ground. The secondary winding of the current transformer is connected to operate a relay which closes another circuit connecting the network to ground. This circuit includes another spark gap device in parallel with an inductance. This arrangement is quite complex and not particularly suited for use in limiting voltages in the secondary of a current transformer.

Yet another protective apparatus is described in Canadian Pat. No. 158,414 - May, issued Oct. 20, 1914. This describes a vacuum lightning arrester with two electrodes defining a spark gap. A coiled strip of conductive metal is restrained in its coiled position by a spot of solder. If an arc current causes too high a temperature in the coil, the solder melts and the coil unwinds and shorts the electrodes. This lightning arrester provides a one-shot protection against unusual currents. It does, however, have a leakage current and it is of a complex design making it unsuitable for use in the secondary of a current transformer.

SUMMARY OF THE INVENTION

The present invention is an improved and simplified arrangement of a protective device adapted for use in the secondary winding circuit of a current transformer. The device is in the form of a tube containing a movable and a fixed electrode defining a spark gap. The spark gap is adjustable. The movable element comprises a spring loaded plunger retained in a preset position by a fusible element which forms one surface of the gap. An overvoltage causes an arc to develop across the gap and limits the voltage. The arc produces heat which melts the fusible element in a time which depends on the spark gap energy. When the fusible element melts, the plunger is released and the plunger moves to contact the stationary electrode to short the circuit permitting a predetermined current to flow through the protective device. The device is compact and draws substantially no current until an arc occurs across the pre-set gap. The accuracy of the current transformer is not affected. The performance of the device is directly related to the energy available thus increasing its effectiveness and enabling it to handle large amounts of energy.

In another embodiment, two auxiliary leads are provided for connection to an annunciator device. The leads are connected to contact means within the tube. This contact means closes when the plunger is driven to contact the fixed electrode, and thus provides an indication that the protective device has operated.

It is therefore an object of this invention to provide a compact and dependable protective device for use in the secondary winding circuit of a current transformer to limit or supress overvoltages in the secondary circuit.

It is another object of the invention to provide an improved protective device for the secondary winding of a current transformer which draws no current over the operating voltage range of the transformer and does not affect the accuracy of the current transformer.

Accordingly there is provided a protective device for protecting an apparatus, against destructive overvoltages comprising a tubular casing of insulating material, a stud support mounted within said casing at a first end thereof, a conductive stud mounted on said stud support, the inner end thereof forming an arcing surface, a support member mounted within said casing at a second end opposite said first end, a conductive plunger mounted in said support member for longitudinal sliding movement between a first position engaging said arcing surface of said stud and a second position spaced from said arcing surface of said stud, a fusible element mounted to the inner end of said support member forming an arcing surface and engaging the inner end of said plunger retaining it in said second position, spring means engaging said plunger and biasing said plunger against said fusible element and towards said first position, means for adjusting the spacing between the arcing surface on said stud and the arcing surface formed by said fusible element, and terminal means on the outer end of said stud and connected to said plunger for connection of said device to an apparatus to be protected whereby an overvoltage will cause an arc discharge between said arcing surface and an arc energy of sufficient level will fuse said fusible element permitting movement of said plunger to said first position shorting the apparatus.

BRIEF DESCRIPTION OF THE DRAWINGS

The invention will be described with reference to the accompanying drawings in which.

DETAILED DESCRIPTION OF THE PREFERRED EMBODIMENTS

Figure 1:
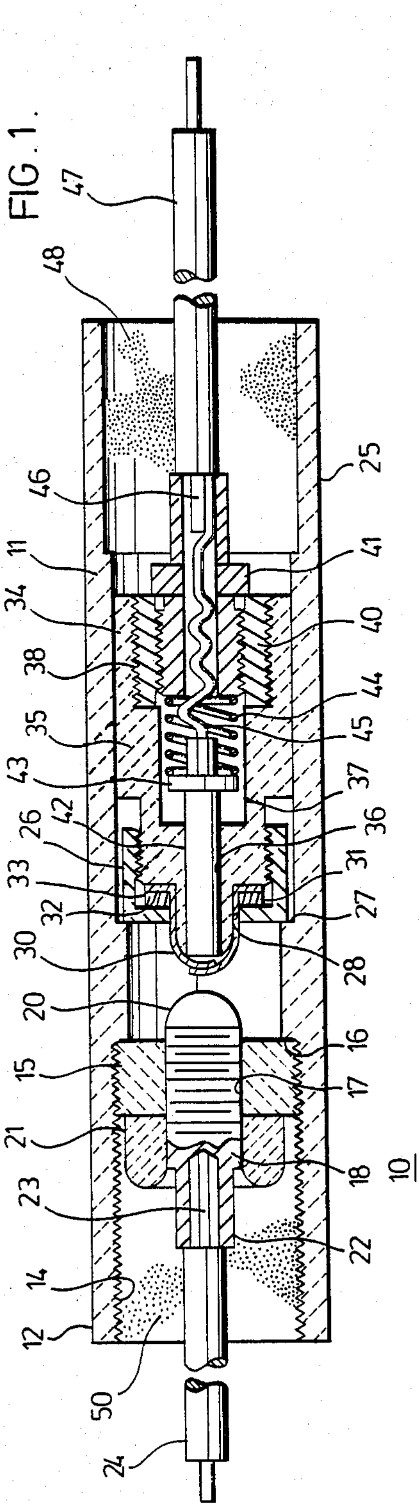
FIG. 1 is a cross-sectional side view of one form of the protective device of the invention.

Referring to FIG. 1, which is a cross-sectional view of a protective device 10, a tubular casing or tube 11 is of insulating material and preferably is also of transparent material, such as for example, extruded acrylic tubing. The use of a transparent tubular casing makes it more convenient to set the gap size as will be discussed subsequently and in addition provides for viewing of the gap to see if the gap is open or if the device is shorted.

A first end 12 of tubular casing 11 is threaded internally at 14. A stud support 15 of insulating material has an external thread for engaging the internal thread 14 of the casing. The stud support 15 is rotated within the casing to move it inwardly until it engages shoulder 16 of the casing 11. The stud support 15 has a centrally located threaded hole 17 for receiving stud 18 of conducting material which has an engaging external thread. Stud 18 has a curved arcing surface 20 which is one of the spark gap electrode surfaces. The stud 18 can be screwed into hole 17 and advanced to a desired position and locked in that position by tightening a locking nut 21 against the outer surface of stud support 15. The locking nut 21 is preferably of insulating material.

The outer end 22 of stud 18 has a central aperture for receiving end 23 of insulated wire conductor 24. After the end 23 is inserted into the aperture in the end 22 of stud 18, the walls comprising end 22 are crimped onto the end 23 of wire 24 to retain the wire in the stud 18 and to establish good contact between the end 23 and the stud 18.

The second end 25 of tubular casing 11 contains a retainer 26 which butts against shoulder 27 of casing 11. The retainer 26 has a central aperture 28 through which overlapping portions of fusible element 30 project as shown. A washer 31 is mounted around aperture 28 and a flange portion 32 of fusible element 30 is clamped between washer 31 and a shoulder 33 of a supported member 34 insulating material. In a preferred form of the invention, the fusible element comprises two or more members of conductive sheet material each having a curved head portion which co-operate to form a curved spark gap terminal having an arcing surface opposite arcing surface 20. The individual members are bonded together with a low melting point substance such as a solder. In this preferred form, when the fusible element "fuses" it is normally the bonding material which melts, releasing the head portions of the members to permit the plunger (to be described subsequently) to move inwardly. The fusible element may also be made of formed metal of a relatively low melting point, in which case it is the metal element which melts. Preferably the inner surface of the cylindrical wall portion of retainer 26 is threaded to engage a threaded end portion of support member 34 to secure the retainer 26 to support member 34 and ensure the fusible element 30 remains in its proper position during assembly.

The support member 34 has a main body portion 35 where outer dimension is only slightly less than the inner dimension of tubular casing 11 in that portion of casing 11 extending from shoulder 27 towards the second end 25. Thus the support member 34 can be slidably inserted into casing 11 and secured in position as shown within the casing, preferably by an adhesive such as an epoxy adhesive.

The support member 34 has a central aperture extending longitudinally and having three different inner diameters. The first diameter portion 36 is the plunger receiving portion; the second diameter portion 37 is the spring chamber; and the third diameter portion 38 is the plug receiving portion. The inner surface of the plug receiving portion 38 is threaded to receive plug 40. Plug 40 is in the form of a cylinder threaded on its outer and inner surface. The threaded outer surface of plug 40 engages the threaded surface of plug receiving portion 38 of support member 34. The threaded inner surface of plug 40 is adapted to threadably engage a terminal 41 of conductive material.

A plunger 42 is slidably mounted in the first diameter portion 36 of support member 34. Plunger 42 has a flat head portion 43 which is within the second diameter portion 37, and an extended hollow cylindrical end. The plunger 42 is biased outwardly by a spring 44 which engages the head 43 of the plunger 42 and the inner end of terminal 41. A flexible, conductive braid 45 is inserted into the open end adjacent head 43 of plunger 42 and the end crimped into the braid to make a firm conductive connection. The braid extends to the outer end of terminal 41. End 46 of insulated wire conductor 47 is inserted into the opening in the outer end of terminal 41 where it is adjacent to the braid 45. The outer end of terminal 41 can be crimped to securely and conductively connect the end 46 of wire 47 and the end of braid 45. There is some slack in braid 45 so that plunger 42 may move ahead under pressure from spring 44 when fusible element 30 melts.

The protective device is readily assembled. The sub-assembly of the plunger 42, spring 44, braid 45, plug 40, terminal 41 and wire 47 is assembled. This may conveniently be done by inserting the braid 45 into the cylindrical opening in the head of the plunger 42 which is then crimped to secure the braid 45. The terminal is secured into plug 40, then braid 45 extends through the centre of spring 44 and the central passage of terminal 41. The end 46 of wire 47 may then be inserted parallel with braid 45 then braid 45 is tightened so that spring 44 is not compressed but one end of spring 44 rests on flat head portion 43 of plunger 42 and the other end against the inner surface of terminal 41. At this point the exposed end of terminal 41 is crimped to secure the end of braid 45 and the end 46 of wire 47. This sub-assembly is now inserted into support member 34 so that plunger 42 enters the first diameter portion 36 of the central opening in support member 34. Then plug 40 is screwed into support member 34 until plug 40 is flush with end of support member 34. The assembly of the fusible element 30, washer 31, retainer 26 to the prior sub-assembly is preferably done in a fixture. The fusible element 30 is placed on the protruding end of plunger 42 then load is applied to compress spring 44 until plunger is flush with end of support member 34 then the fusible element 30 is formed around the electrode end of support member 34. Washer 31 is now assembled over fusible element 31 to rest against position 33 on fusible element 30 and is clamped in position by screwing retainer 26 over fusible element 30 resting against washer 31 on surface 32 onto support member 34 to secure the fusible element 31. The entire sub-assembly may then be inserted into the end 25 of tubular casing 11 until retainer 26 butts against shoulder 27. The sub-assembly is preferably secured within the casing 11 using an epoxy, and the open second end of casing 11 filled with a potting compound 48, for example an epoxy potting compound.

The stud support 15 is then screwed into end 12 of casing 11 until it butts against shoulder 16. End 23 of wire 24 is inserted in the outer end 22 of stud 18 and the outer end crimped to fasten the wire conductor to the stud 18. Stud 18 is threaded into locking nut 21 and then into stud support 15 until a specified gap is formed between fusible element 30 and arcing surface 20. When the gap is set, locking nut 21 is tightened against the outer surface of stud support 15 to secure stud 18 in position to ensure established arcing gap. Preferably the open first end 12 of casing 11 is then filled with a potting compound 50, for example an epoxy potting compound.

When a protective device is fused, it is desirable to detect the fused device as soon as possible. When the protective device fuses the current transformer is inoperative and in addition would normally have an open secondary circuit. There is no longer a protective device with an operating spark gap across the secondary and this may present a possible hazard to the system.

It is, of course, possible to observe a fused protective device through the transparent casing. However, it may not be feasible to inspect each protective device visually and no convenient annunciating device appears to have been available in the past.

Figure 2:
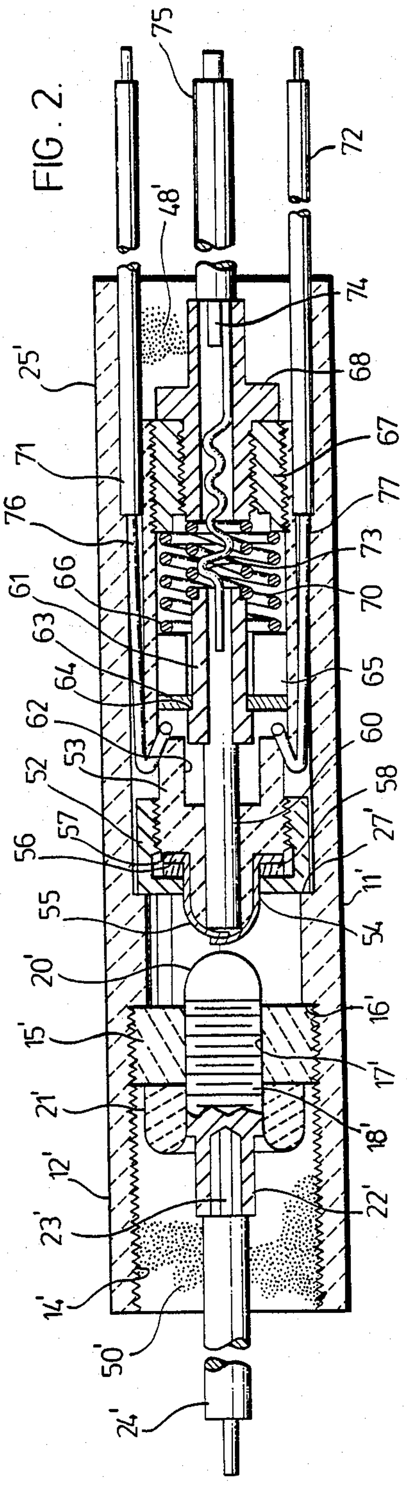
FIG. 2 is a cross-sectional view of another form of the invention.

The embodiment of the invention shown in FIG. 2 includes annunciating means. Referring to FIG. 2, the end 12' of the tubular casing 11' contains the same components as the embodiment of FIG. 1, that is the fixed (initially adjustable) electrode with arcing surface 20 is the same. The parts or components which are the same quality have like designation numbers that are provided and will not be described again. The opposite end 25' of tubular casing 11' as shown in FIG. 2, contains some parts or components similar to those in the FIG. 1 embodiment and some new parts or components. For convenience, these will be described using new designation numbers.

Still referring to FIG. 2, a retainer 52 is seated on shoulder 27' in tubular casing 11'. Retainer 52 has cylindrical side walls spaced inwardly from the inner surface of tubular casing 11' so that the retainer 52 shifts easily within the casing 11' until it seats against shoulder 27'. The side walls of retainer 52 are threaded on the inner surface thereof to threadably secure it to support member 53 as shown. Retainer 52 has a central aperture 54 through which fusible element 55 extends. Fusible element 55 has a flange 56 which is positioned between shoulder 57 and washer 58 so that it is retained firmly in place when retainer 52 is screwed onto support member 53. A central aperture of varying cylindrical diameters extends longitudinally through support member 53. One of these apertures is a plunger-receiving aperture through which the shorting plunger 60 slides. A plunger guide 61 of insulating material is secured around the outer end of plunger 60. The guide 61 has an outer diameter which provides a clearance fit inside portion 62 of the aperture extending longitudinally in support member 53. Positioned around plunger guide 61 is an auxiliary contact 63 in the form of a conductive ring. The contact 63 rests against a small shoulder 64 in plunger guide 61 which prevents movement of the contact 63 past shoulder 64 (to the left in FIG. 2). The contact 63 is able to slide over the surface of plunger guide 61 (to the right in FIG. 2), however contact 63 is biased against shoulder 64 by a spring as will be described hereinafter. A spacer 65 of insulating material, in the form of a hollow cylinder, fits within the aperture in support member 53 and around plunger guide 61. The spacer 65 is a sliding fit with respect to both the inner surface of support member 53 and plunger guide 61, and it bears against auxiliary contact 63 and provides a seat for spring 66. A plug nut 67 in the form of a cylinder of insulating material is threaded both internally and externally. The threaded outer surface engages the threaded portion of a plug receiving portion of the inner opening of support member 53. The threaded inner surface of plug 67 is adopted to threadably engage a terminal 68 of conductive material. The previously mentioned spring 66 engages spacer 65 and plug 67. A spring 70 engages at one end thereof the plunger guide 61 and at the other end the terminal 68.

Insulated wires 71 and 72, having conductors 76 and 77 for connection to a power supply and annunciator light, extend within casing 11' and the conductors extend through support member 53 and into the inner aperture where they terminate a short distance from contact ring 63. The contact 63 is restrained from engaging the conductors of wires 71 and 72 by shoulder 64 on plunger guide 61 which is mounted on plunger 60. When plunger 60 moves inwardly under the influence of spring 70, the plunger guide 61 also moves inwardly and the contact 63 under the influence of spring 66 acting through spacer 65 moves inwardly to engage the conductors of wires 71 and 72 to complete a circuit. The spacing between the conductors of wires 71 and 72 and the contact ring 63 is less than the distance the plunger moves to ensure that the annunciator light circuit is completed when the plunger 60 is released.

A conductive braid 73 is crimped to plunger 60 and extends loosely through an internal passage in terminal 68 to the outer end. End 74 of insulated wire conductor 75 is inserted in the open end of terminal 68 where it is adjacent conductive braid 73. The outer end of terminal 68 can be crimped to securely and conductively connect the end 74 of wire 75 to the end of braid 73. There is, of course, sufficient slack in braid 73 to permit plunger 60 to move ahead under pressure from spring 70 until it contacts arcing surface 20'.

The auxiliary annunciating contacts are closed by auxiliary contact 63 which is carried directly by plunger 60. There are not intermediate parts. There is a reliable indication when the device shorts.

The assembly of the FIG. 2 embodiment is quite similar to the assembly of the FIG. 1 embodiment except a few additional steps are required in completing the sub-assembly because of additional parts. The sub-assembly is started, as before by inserting the braid 73 into the cylindrical opening in the end of plunger 60 which is then crimped to secure braid 73. The terminal 68 is screwed into plug 67 until tightly fastened together. Plunger guide 61 is slid over braid 73 and pressed onto plunger 60 until end of plunger 60 is flush with plunger guide 61. Contact ring 63 and spacer 65 are placed in position around plunger guide 61 with contact ring 63 on shoulder 64. Springs 66 and 70 are placed over braid 73 and braid 73 is guided into the central aperture of terminal 68. End 74 of wire 75 is placed in the open end of terminal 68 then braid 73 is tightened so that spring 70 is not compressed but one end is resting on end of plunger guide 61 and the other end against the inner surface of terminal 68. At this point the exposed end of terminal 68 is crimped to secure the end of braid 73 and the end 74 of wire 75. This completes the first sub-assembly.

The second sub-assembly is started by inserting the stationary auxiliary contacts 76 and 77 into the inside of support member 53 and out through the two angle apertures of the support member 53 forming contact leads 76 and 77 at right angles and down into the longitudinal slots in support member 53 thus securing the formed ends so they can be engaged by the auxiliary contact ring 63. The insulation in the form of sleeves are then assembled over the stationary auxiliary contact conductors 76 and 77 forming wires 71 and 72 as shown in FIG. 2.

The first sub-assembly is now assembled inside of support member 53 with the plunger 60 extending through the plunger receiving opening in the support member 53 then plug 67 is screwed into support member 53 until they are flush with each other on the exposed end. The assembly of the fusible element 55, washer 58 and retainer 52 to the prior sub-assembly is preferably done in a fixture. The fusible element 55 is placed on the protruding end of plunger 60 then load is applied to compress springs 66 and 70 until there is a specified gap between contact ring 63 and the stationary auxiliary contacts position 78. At this point the fusible element 55 is formed over the electrode end of support member 53. Washer 58 is now assembled over fusible element 55 and is clampled in position by screwing retainer 52 over fusible element 55 resting against washer 58 on the surface 56, onto the support member 53 to secure the fusible element 55. This completes the sub-assembly which is then inserted into end 25' of casing 11' and secured in place using an adhesive such as an epoxy adhesive. The stud support 15', stud 18', locking nut 21 and wire 24' are assembled in the other end of casing 11' in the same manner as for the FIG. 1 embodiment. The open ends of casing 11' are filled with a potting compound (preferably an epoxy potting compound) as indicated at 48' and 50'.

The operation of the protective device will be apparent and will be described only briefly. The device is connected across the secondary winding of a current transformer. When the transformer is operating normally the device draws no current. When an overvoltage appears across the secondary sufficient to cause an arc between the two electrodes spaced at a desired spacing, a current flows. If the overvoltage condition disappears in a short time, normal operation resumes. If the overvoltage persists and the arc current continues, the fusible element melts and the plunger moves across the arc gap to short the secondary and reduce the voltage. In the FIG. 2 embodiment the movement of plunger 60 will permit contact ring 63 to contact the ends of wires 71 and 72 to complete a circuit. Wires 71 and 72 would normally be connected to a power supply and indicator light (not shown) and the completion of the circuit would cause the indicator light to turn on indicating or annunciating the protective device has operated and the circuit in which it is connected is no longer functioning.

The protective device can, of course, be used to protect other apparatus than the secondary of a current transformer where such protection is desired, that is when protection is desired which provides a short circuit across the circuit to be protected.

What I claim as new and desire to secure by Letters Patent of the United States of America is:

1. A protective device for protecting an apparatus, against destructive overvoltages comprising, a tubular casing of insulating material, a stud support mounted within said casing at a first end thereof, a conductive stud mounted on said stud support, the inner end thereof forming an arcing surface, a support member mounted within said casing at a second end opposite said first end, a conductive plunger mounted in said support member for longitudinal sliding movement between a first position engaging said arcing surface of said stud and a second position spaced from said arcing surface of said stud, a fusible element mounted to the inner end of said support member forming an arcing surface and engaging the inner end of said plunger retaining it in said second position, spring means engaging said plunger and biasing said plunger against said fusible element and towards said first position, means for adjusting the spacing between the arcing surface on said stud and the arcing surface formed by said fusible element, and terminal means on the outer end of said stud and connected to said plunger for connection of said device to an apparatus to be protected whereby an overvoltage will cause an arc discharge between said arcing surface and an arc energy of sufficient level will fuse said fusible element permitting movement of said plunger to said first position shorting the apparatus.

2. A protective device for protecting an apparatus against destructive overvoltages comprising a tubular casing having a first and a second end, a stud support of insulating material mounted within said casing at said first end, a conductive stud mounted in said stud support for adjustable longitudinal movement with said casing, the inner end of said stud having an arcing surface and the outer end having first terminal means, a support member of insulating material mounted within said casing at said second end, said support member having a central aperture, a conductive plunger mounted within said support member for longitudinal sliding movement between a first position engaging said arcing surface of said stud and a second position spaced from said arcing surface of said stud, a fusible element mounted to the inner end of said support member and extending across at least a portion of said aperture to form an arcing surface opposing the arcing surface of said stud and engaging the end of said plunger to retain said plunger in said second position, spring means engaging said plunger and biasing said plunger against said fusible element and towards said first position, and flexible conductor means connecting said plunger with a second terminal means, said first and second terminal means being adapted to connect said protective device across a circuit from aperture to be protected whereby an overvoltage causes an arc discharge between said arcing surfaces and sufficient arc energy fuses said fusible element permitting said plunger to move to said first position shorting said circuit.

3. A protective device as defined in claim 2 and further comprising a pair of annunciator wires having central conductors extending within said second end of said casing and each terminating within said support member, spaced from said plunger and from one another, an auxiliary contact member extending at least part way around said plunger and spaced therefrom by insulating means, spring means biasing said contact member inwardly towards the terminating ends of said annunciator wires, means on said plunger retaining said contact member against inward movement, movement of said plunger to said first position permitting said contact member to contact the terminating ends of said annunciator wires to complete a circuit therethrough.

4. A protective device as defined by claim 3 in which said means on said means plunger guide of insulating material surrounding said plunger and having a projecting shoulder for supporting the control portion of said contact member to restrain it from inward movement with respect to the plunger and further including an insulating spacer behind said contact member, said spring means biasing said contact member inwardly engaging said insulating spacer.

5. A protective device as defined in claim 3 in which said auxiliary contact member is in the form of a ring.

6. A protective device as defined in claim 3 in which said tubular casing is of transparent material to facilitate adjustment of stud in said stud support to set a desired spacing between the arcing surface of said stud and said fusible element.

7. A protective device as defined in claim 3 in which said stud support has a threaded control aperture for receiving said conductive stud and in which said conductive stud has a mating external thread whereby rotation of said stud will longitudinally adjust the position of said arcing surface of said stud.

8. A protective device as defined in claim 3 in which said spring means engaging said plunger is a spring bearing against the inner portion of said plunger at one end and bearing against a plug secured within said support member adjacent the outer end thereof.

9. A protective device as defined in claim 4 in which said support member is bonded to said casing using an epoxy adhesive.

10. A protective device for connecting across the secondary winding of a current transformer to provide protection against overvoltages, comprising a transparent tubular casing having a first and second end, the inner surface of said first end being threaded, a stud support of insulating material having a threaded periphery threadably engaging said threaded inner surface of said first end and having an axially extending threaded hole, a conductive stud having a threaded surface portion for threadably engaging said axially extending threaded hole in said stud support for longitudinally positioning of said stud, said stud having a curved arcing surface on the inner end thereof and a first terminal means on the outer end thereof, a support member of insulating material adhesively mounted within said second end of said casing, said support member having a longitudinally extending opening having a first, second and third portion of increasing diameters, the smallest diameter being at the innermost end, a conductive plunger dimensional for a sliding fit within said first diameter portion between a first position engaging said arcing surface of said stud and a normal second position spaced from said arcing surface of said stud, a fusible element mounted to the inner end of said support member and extending across at least a part of said first portion of said opening in said support member, said fusible element being formed to provide an arcing surface spaced from said arcing surface on said stud, said fusible element engaging the end of said plunger to retain said plunger in its second position, the third diameter portion of said opening in said support member being threaded over at least a portion thereof, a tubular plug having its outer and inner surfaces threaded, said outer surface threadably engaging said threaded portion of said third diameter portion of said support member, a second terminal means of conductive material threadably enaging the threaded inner surface of said plug, a spring engaging said plunger and said second terminal means to bias said plunger inwardly against said fusible element, a flexible conductive braid connecting said plunger and said second terminal means and having a sufficient length to permit said plunger to move to said first position, said first and second terminal means being adapted for connection across said secondary winding whereby an overvoltage on said secondary winding causes an arc discharge current to flow between said arcing surfaces and sufficient heat fuses said fusible element to release said plunger to its first position providing a short across said secondary windings.

11. A protective device as defined in claim 10 and further comprising a plunger guide of insulating material surrounding a portion of said plunger and having an outer diameter for sliding engagement with said second portion of said opening in said support member, said plunger guide having a shoulder spaced from its innermost end and provided by a slightly reduced diameter extending to its outermost end, an auxiliary contact in the form of a conductive ring positioned around said plunger guide and supported by said shoulder, a spacer of insulating material around said plunger guide, having a more sliding fit with said plunger and with the inner wall of said support member, a pair of insulated wires extending into said casing through said second end and having central conductors in spaced apart relationship extending through said support member and each terminating within said support member spaced from said auxiliary contact, a spring engaging said spacer and said plug to bias said auxiliary contact against said shoulder and towards the terminating ends of said conductors whereby movement of said plunger from said second position towards said first position will permit said auxiliary contact to contact both of the terminating ends of said conductors before said plunger reaches said first position to complete a circuit between said wires for indicating operation of said protective device.

12. A protective device as defined in claim 1 in which said fusible element comprises at least two members of formed conductive sheet material bonded together by a low melting point solder to form the plunger retaining end thereof.

13. A protective device as defined in claim 10 in which said fusible element comprises at least two members of formed conductive sheet material bonded together by a low melting point solder to form the plunger retaining end thereof.

* * * * *